3,365,518
PROCESS FOR INCREASING THE DRUM DRYING RATE OF POLYCHLOROPRENE BY ADDING POLYVINYL METHYL ETHER

Rowland Whincup Saville, Coleraine, Northern Ireland, assignor to E. I. du Pont de Nemours and Company, Wilmington, Del., a corporation of Delaware
No Drawing. Filed Aug. 2, 1965, Ser. No. 476,750
3 Claims. (Cl. 260—890)

This invention concerns improvements in and relating to the manufacture of neoprene, i.e., polychloroprene (poly-2-chlorobutadiene-1,3). More particularly this invention relates to the isolation of neoprene from its polymerization mixture.

According to the present invention, a polychloroprene dispersion is prepared by conventional means and after polymerization but before the polychloroprene is isolated from its dispersion by drum-drying, a polyvinyl methyl ether is added to the dispersion in amounts of about 0.03 to 2.0% by weight of the polychloroprene.

The manufacture of polychloroprene may otherwise be carried out by conventional means, for example as described in British patent specification No. 807,496 (U.S. 2,914,497), involving forming an emulsion of chloroprene, polymerizing, short-stopping the polymerization, stripping out unpolymerized monomer and after adding the polyvinyl methyl ether according to the invention, drum-drying the dispersion to form a film of polychloroprene, which may then be processed, e.g., comminuted, according to conventional techniques.

The polyvinyl methyl ether may be, for example, the polyvinyl methyl ether sold by Badische Anilin- und Soda Fabrik as "Lutonal" M-40 (in the United States as "Gantrez" M-154 by General Aniline and Film Corporation). It has been found convenient to add the polyvinyl methyl ether in the form of an aqueous solution, e.g., containing about 15% to 20% by weight polyvinyl methyl ether, at a time when the polychloroprene dispersion contains about 40 to 45% by weight solids.

The addition of polyvinyl methyl ether has been found to be of advantage since the drying times on a drum-dryer (usually heated by steam at 25 to 150 p.s.i.) have been significantly reduced in comparison with prior art drum-drying processes on polychloroprene latices containing no polyvinyl methyl ether. The addition of polyvinyl methyl ether effects no significant change in the processing and curing of the resulting polymer.

The invention will be further described in the following examples. All parts and percentages are by weight unless otherwise indicated.

Example I

Polychloroprene latices are prepared and dried as described in Example 5 of British Patent specification No. 807,496 except that a larger drum-dryer of 5-feet diameter is used at the speeds shown, the steam pressure is 140 p.s.i.g., and, before drum-drying, when the solids content of the latices are about 44%, varying amounts of "Lutonal" M-40 polyvinyl methyl ether having a viscosity of 43,000 centipoises in 50% aqueous solution, an inherent viscosity of 0.35, molecular weight 40,000, are added to separate samples, the amount being calculated as the weight of polyvinyl methyl ether on the weight of the dried polymer. The drying is carried out under such conditions as to yield a dried polychloroprene containing approximately 1% volatile material. The drying rates of samples containing "Lutonal" M-40 are compared with the drying rates of control samples containing no "Lutonal" M-40 in the following table.

TABLE

| "Lutonal" M-40, percent | Drum speed, r.p.m. | | Rate of Latex Feed, lbs./hr. | | Drying Rate, lbs./hr. | | | Drying Rate Increase, percent |
|---|---|---|---|---|---|---|---|---|
| | Control | "Lutonal" M-40 | Control | "Lutonal" M-40 | Control | "Lutonal" M-40 | Increase | |
| 0.05 | 12-15 | 18 | 4,230 | 4,590 | 1,860 | 2,020 | 160 | 8.6 |
| 0.08 | 12-15 | 20-21 | 4,210 | 4,680 | 1,850 | 2,060 | 210 | 11.3 |
| 0.22 | 12-18 | 19-21 | 4,000 | 4,550 | 1,760 | 2,000 | 240 | 13.6 |
| 0.40 | 12-18 | 19-20 | 4,000 | 4,800 | 1,760 | 2,110 | 350 | 16.6 |

Example II

A polychloroprene latex is prepared according to the procedure of Example I of British Patent 807,496. The latex is dried on a laboratory drum-dryer at 15 r.p.m. at a steam pressure of 145 p.s.i.g. with quantities of polyvinyl methyl ether ("Lutonal" M-40) added to the latex before drying as shown in the following table. The feed rate of the latex to the drum-dryer is adjusted so as to obtain a dried polychloroprene containing 1% volatile material.

TABLE

| "Lutonal" M-40, percent | Latex Feed, lbs./hr. | Drying Rate, lbs./hr. | Drying Rate Increase, percent |
|---|---|---|---|
| None-control | 77.3 | 29.4 | |
| 0.05 | 80.3 | 30.5 | 3.7 |
| 0.10 | 85.0 | 32.3 | 9.9 |
| 0.30 | 88.4 | 33.6 | 14.3 |
| 1.0 | 86.9 | 33.0 | 12.2 |

Other polychloroprene latices may be substituted for those above and similar improvements in drying rates obtained.

The increase in drying rate obtained by using more than about 2% polyvinyl methyl ether, based on the polychloroprene, is usually not appreciable. The preferred amount of polyvinyl methyl ether is about 0.03 to 1.0% by weight of the dry polychloroprene.

What is claimed is:

1. A process for increasing the drying rate of an aqueous dispersion of polychloroprene which comprises mixing with said dispersion about 0.03 to 2.0% of polyvinyl methyl ether by weight of polychloroprene and drum-drying said mixed dispersion.

2. A process as defined in claim 1 where said polyvinyl methyl ether is present in amounts of about 0.03 to 1.0% by weight of said polychloroprene.

3. A process for increasing the drum-drying rate of a polychloroprene aqueous dispersion having no more than 45% by weight solids which comprises mixing with said polychloroprene dispersion about 0.03 to 1.0% of polyvinyl methyl ether by weight of said polychloroprene and drum-drying said mixed dispersion so that the dry polychloroprene contains no more than about 1% by weight of volatile material.

References Cited

UNITED STATES PATENTS 3,049,501  8/1962  Howland et al. ____ 260—17.4

MURRAY TILLMAN, *Primary Examiner.*

M. J. TULLY, *Assistant Examiner.*